United States Patent [19]
Clegg

[11] Patent Number: 4,589,741
[45] Date of Patent: May 20, 1986

[54] UNIVERSAL REVOLVING MICROSCOPE STAGE

[76] Inventor: John E. Clegg, 2320 Keystone Dr., Orlando, Fla. 32806

[21] Appl. No.: 685,007

[22] Filed: Dec. 21, 1984

[51] Int. Cl.⁴ ............................................. G02B 21/26
[52] U.S. Cl. .................................... 350/532; 108/103; 74/89.15
[58] Field of Search ................. 350/532, 529; 108/140, 108/103, 104; 74/89.15, 840, 841

[56] References Cited

U.S. PATENT DOCUMENTS

| | | | |
|---|---|---|---|
| 893,957 | 7/1908 | Watkins | 350/532 |
| 2,960,913 | 11/1960 | Herrala | 350/532 |

FOREIGN PATENT DOCUMENTS 449774 7/1936 United Kingdom ................ 350/532

OTHER PUBLICATIONS

F. L. J. Boettcher, "A Slide-Carriage . . . ", *The American Monthly Microscope Jour.*, Jul. 1898, pp. 200–202.

*Primary Examiner*—Jon W. Henry

[57] ABSTRACT

A stage which can be revolved and moved linearly simultaneously by turning a single knob. The specimen revolves in an involute curve beneath the objective lens. A wheel revolves the stage while a threaded shaft applies linear displacement of the stage.

1 Claim, 2 Drawing Figures

UNIVERSAL REVOLVING MICROSCOPE STAGE

BACKGROUND

Prior art includes two patented stages described below;

1. *Mechanical Stage For Microscopes And The Like,* U.S. Pat. No. 893,957, July 21, 1908, R. L. Watkins. This stage has an involute cam track.
2. *Microscope Mechanical Stage Etc.,* U.S. Pat. No. 2,960,913, Nov. 22, 1960, C. O. Herrala. This stage has movement along mutually perpendicular x and y axes.

DRAWINGS

DESCRIPTION

Figure 1:
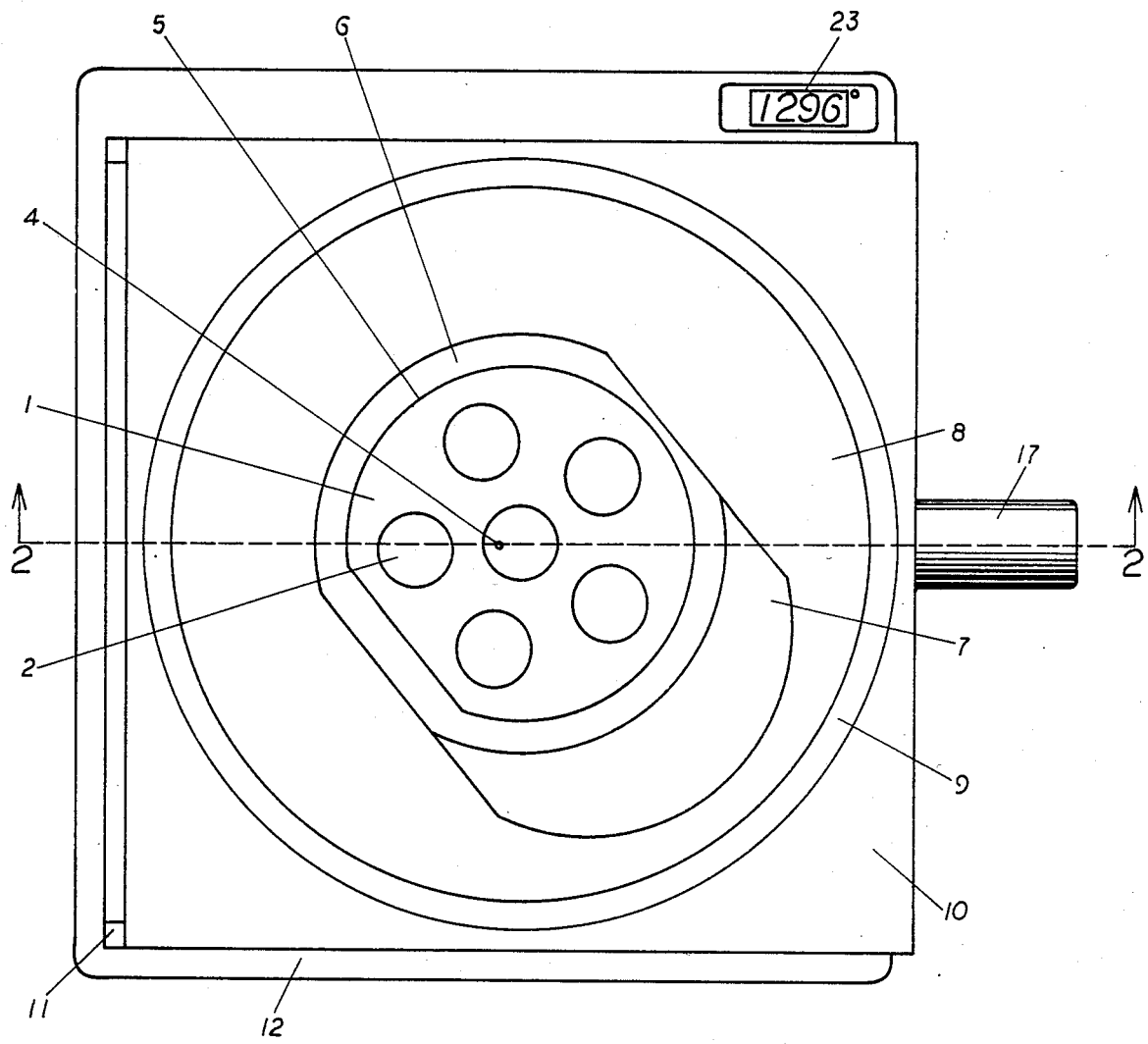
FIG. 1 is a plan view of the universal revolving microscope stage.
Figure 2:
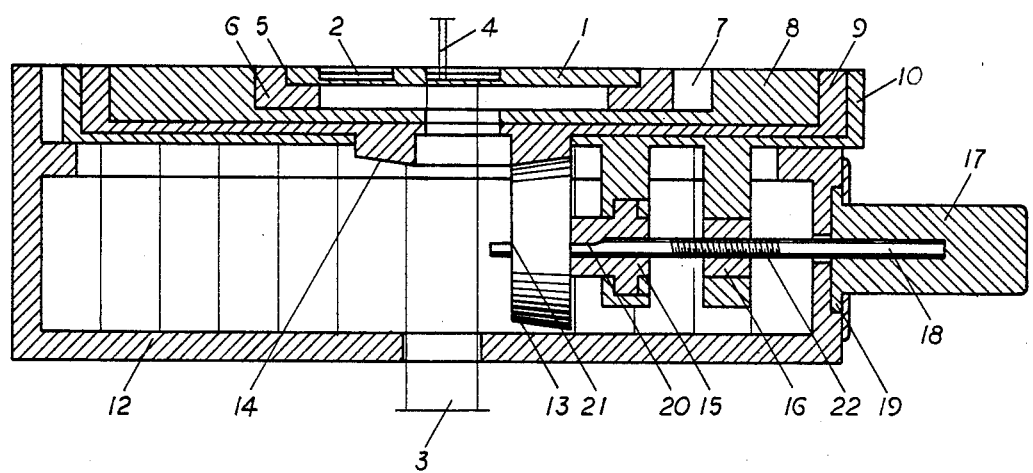
FIG. 2 is a cross section taken on line 2—2 of FIG. 1.

The universal revolving microscope stage is designed for use with the circular specimen slide 1 with six depressed compartments 2 in which specimens are placed as shown in FIGS. 1 and 2. The specimens are illuminated by a concentrated beam 3 from a beam concentrator. Incident beam 4 from the specimen is received by a concave conical section (face) of the lower component lens of the microscope, with the diameter of the beam and the section being 1 mm.

Slide 1 is mounted in slot 5 of platform 6, with the straight inside edge of slot 5 and the straight outside edge of slide 1 providing standard orientation of slide 1. Slide platform 6 is mounted in platform slot 7 of inner stage 8, with platform slot 7 extending laterally to allow slide 1 to be moved so as to place the five peripheral compartments 2 below the lens when inner stage 8 is revolved.

Inner stage 8 is mounted in circular revolving stage 9 which is mounted in horizontal carrier 10. Opposite sides of carrier 10 engage two parallel recessed tracks 11 of housing 12 and permit linear movement of carrier 10 and all parts mounted thereon.

Revolving stage 9 is revolved by roller 13 which engages circular track 14 on the bottom of revolving stage 9 and which is attached to bushing 15 mounted to the bottom of carrier 10.

Fixed bushing 16 with internal threads is also mounted to the bottom of carrier 10.

The stage is operated by turning cylindrical knob 17 which is attached to revolving shaft 18 and which is mounted in housing 12 by flange 19. Flat end portion 20 of shaft 18 engages key 21 of bushing 15 and revolves roller 13 which in turn revolves stage 9. Threaded portion 22 of shaft 18 engages threaded bushing 16 and moves carrier 10 linearly across housing 12.

The circumference of roller 13 is equal to the circumference of circular track 14 so that one revolution of knob 17 revolves stage 9 one revolution. The pitch of threaded portion 22 of shaft 18 is 1 mm, which is the linear movement produced by one revolution of knob 17 and also the diameter of incident beam 4. Revolution and linear movement occur simultaneously, and incident beam 4 traces an involute curve from the center to the edge of the specimen.

Six revolutions (2160°) are needed to view the entire area of the specimen, which is 12 mm in diameter. The revolutions are registered in degrees by meter 23. The position of incident beam 4 in FIG. 1 is 3.6 mm from the center of the specimen, and the reading for this position is 1296°.

The advantage of the universal revolving microscope stage over other revolving stages with two perpendicular means of movement and coordinate systems of recording positions of the specimen is that only one operating knob and only one recording of position are needed to locate and identify a position of the specimen. A position, having been recorded, can be relocated easily later even after the slide has been removed from and returned to the stage.

I claim:

1. A universal revolving microscope stage comprising;
   a. A horizontal carrier (10) mounted at opposite sides on two parallel recessed tracks (11) in a rectangular housing (12) in which said carrier (10) moves linearly,
   b. A circular revolving stage (9) with a circular track (14) located on the bottom thereof mounted inside said carrier (10),
   c. A roller (13) mounted on a horizontal revolving bushing (15) attached to the bottom of said carrier (10), with said roller (13) engaging said track (14) as means of revolving said stage (9),
   d. A fixed bushing (16) with internal threads mounted on the bottom of said carrier (10), and
   e. A horizontal revolving shaft (18) with a threaded portion (22) engaging the internal threads of said bushing (16) as means of imparting linear movement to said carrier (10), and with a flat-sided portion (20) engaging a key (21) of said bushing (15) as means of revolving said stage (9).

* * * * *